June 24, 1924.

Re. 15,862

A. CLAUD-MANTLE

CABINET LATCH

Original Filed April 2, 1921

INVENTOR

ARTHUR CLAUD-MANTLE.

BY

Edwin Matthews.

ATTORNEY

Reissued June 24, 1924. Re. 15,862

UNITED STATES PATENT OFFICE.

ARTHUR CLAUD-MANTLE, OF BRIDGEPORT, CONNECTICUT, ASSIGNOR TO THE BASSICK COMPANY, OF BRIDGEPORT, CONNECTICUT, A CORPORATION OF CONNECTICUT.

CABINET LATCH.

Original No. 1,437,793, dated December 5, 1922, Serial No. 458,153, filed April 2, 1921. Application for reissue filed April 29, 1924. Serial No. 709,926.

*To all whom it may concern:*

Be it known that I, ARTHUR CLAUD-MANTLE, a citizen of the United States, residing at the city of Bridgeport, in the county of Fairfield and State of Connecticut, have invented certain new and useful Improvements in Cabinet Latches; and I do declare the following to be a full, clear, and exact description of the invention, such as will enable others skilled in the art to which it appertains to make and use the same.

This invention relates to certain new and useful improvements in cabinet latches, and an important object thereof is to provide a latch, including a latch casing or stationary support and movable latch means formed to simplify and facilitate the shipment, which has but few parts, and which may be constructed so as to provide a knockdown latch in which the parts can be easily and quickly assembled in operative relation.

A still further object of the invention is to provide a latch wherein same can be operated with equal conditions whether the keeper be placed above or below the latch proper, and also regardless of whether the door of the cabinet is to the right or left of the keeper.

Figure 1:
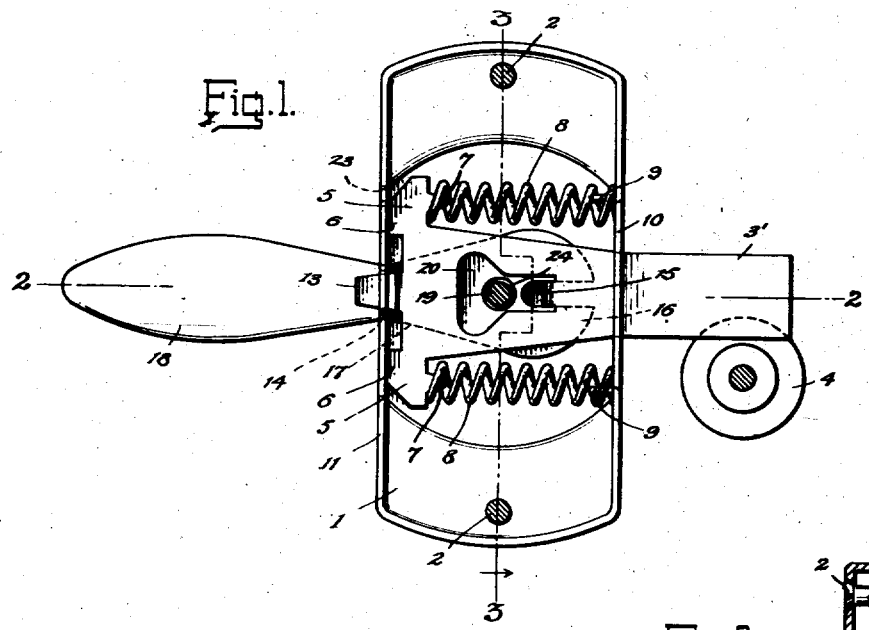
Figure 1, is a rear elevation of the invention, according to the present embodiment thereof.
Figure 2:
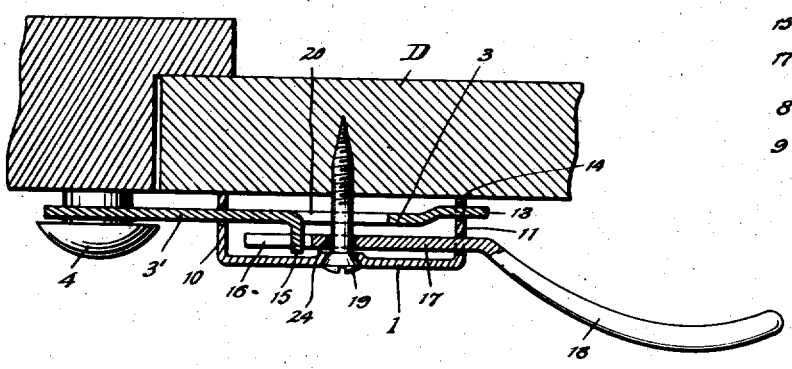
Figure 2, is a section on line 2—2 of Figure 1.
Figure 3:
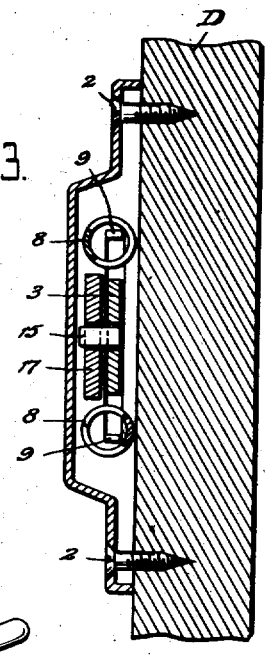
Figure 3, is a section on line 3—3 of Figure 1.

In proceeding in accordance with the present invention, a hollow casing 1, is employed which preferably has an open back as shown which may be secured to a door D by screws 2. The latch proper, according to the present embodiment of the invention, has a nose 3′ for engagement with a suitable keeper 4, which nose extends through an opening in a side 10 of the casing. The rear or inner end of the latch member 3 is formed with upper and lower arms 5, the outer sides of which are formed with rocking points or terminals 6 that contact with the opposite side wall 11 of the casing, while the inner sides of the arms have lugs 7 which are received within one end of a pair of coil springs 8. The opposite ends of the coil springs are engaged over lugs 9 that are struck out from the side wall 10 of the casing. Preferably a guiding tongue 13 is formed on the latch member 3 and extends between the arms 5 and guidingly engages in a slot 14 provided therefor in the side wall 11 of the casing.

The latch member is further formed with a preferably struck-out finger 15 which latter engages in the bifurcated end 16 of the operating member 17. The operating member 17 has a handle 18 which extends through a slot 23 in the side wall 11 of the casing and is pivoted to a screw 19, which latter engages the front wall of the casing 1 and assists in securing the casing to the door. The latch member has an opening 20 in which screw 19 is received to allow of vertical movements thereof.

It will be therefore observed from the foregoing that by moving the handle 18 of the member 17 downwardly the bifurcated end 16 of the member 17 will engage the finger 15 and press upwardly thereon, causing the upper terminal or point 6 of the latch member to engage side wall 11 of the casing and rock thereon to thereby move the nose 3′ upwardly out of engagement with the keeper; the action being in the nature of a compound leverage to multiply the power applied to the member 3. It is obvious that a handle formed integral with the member 3, as for instance in continuation of either the nose 3′ or the tongue 13, could be employed for the purpose of rocking the latch member.

Similarly reverse movement of the handle will effect reverse movement of the parts just described, the lower terminal or point in this instance engaging the casing wall 11 so that the latch member rocks about this lower terminal.

From the foregoing it will therefore be seen that the latch terminates at its inner extremity in a rocker plate which has two spaced points of contact with the casing, and this rocking is rendered resilient by means of the two springs which are confined between the casing and the rocking contacts, so that the latch member is balanced and can rock in either direction so as to engage the keeper from a point below or above, or so that it can be applied and operated whether the cabinet door is at the right or at the left of the keeper.

Further, in shipping, the bodies of the latch being flat can be packed in ordinary cartons, while the handles can be instantly moved into and out of the slots 23 in the casing, following withdrawal of the screws 19 and can be shipped in bulk packages. To assemble it is merely necessary to insert the handle member into the slot 23 and then insert the screw 19 through the opening 20 and through the opening 24 in the member 17.

Instead of a wood screw 19, any ordinary machine screw may be used, or the member 17 may be pivoted to the casing in any suitable manner, and therefore the opening 20 is not necessary unless a long screw similar to that shown is used.

What is claimed is:

1. In a latch, a casing, a latch member therein having upper and lower points formed to rockingly engage the casing, spring means exerting pressure on said points for normally holding the latter engaged with the casing, an operating handle member pivoted to the casing, and a connection between said members whereby the movements of the handle in reverse directions will effect the rocking of the latch member.

2. In a latch, a casing, a latch member therein having two spaced rocking points, spring means exerting pressure on said points, and a handle member pivoted to the casing, said members being interconnected whereby the rocking of the latch member will be effected by the reciprocation of the handle member.

3. In a latch, a structure including a substantially flat casing, a spring tensioned rocking latch member therein formed to engage the casing and rock thereon, a handle insertible in and removable from the casing, and means for detachably pivoting said handle to a stationary part.

4. In a latch, a casing, a latch member therein having upper and lower points formed to rockingly engage the casing, spring means exerting pressure on said points for normally holding the latter engaged with the casing, an operating member having a handle, means for pivoting said operating member to the casing, the latch member having a struck-out finger and the operating member having a bifurcated end to receive the finger.

5. In a latch, a casing, a latch member therein having upper and lower points formed to rockingly engage the casing, spring means exerting pressure on said points for normally holding the latter engaged with the casing, an operating member having a handle, and means for pivoting the operating member to the casing, said members being operatively assembled and the casing having a slot through which a tongue extends from the latching member.

6. In a latch, a casing, a spring tensioned rocking member therein having two diametrically opposite points formed to engage the casing and rock thereon, a finger borne by the member, an operating member having a bifurcated end to receive the finger, and a pivot for the operating member whereby upon withdrawal of the pivot the operating member may be withdrawn from engagement with the casing.

7. In a latch, a casing, latch means therein including a nose projecting at one side of said casing and an operating handle projecting at another side, spaced upper and lower fulcrum means for said latch means about which said latch means is adapted to be respectively rocked in one or the other direction, and yieldable means adapted to normally retain said latch means in neutral position with respect to both of said fulcrum means.

8. In a latch, a casing having spaced fulcrum points, latch means having spaced fulcrum portions adapted to lockingly engage said fulcrum points of said casing, and spring means adapted to yieldably retain said fulcrum portions in engagement with said respective fulcrum points whereby said latch means may be rocked in one or the other direction about said respective fulcrum points.

9. In a latch, a casing having abutment means, latch means mounted in said casing having spaced fulcrum portions engaging said abutment means for independent rocking movement in one or the other direction, and means adapted to yieldably retain said latch means in neutral position with respect to said abutment means.

10. In a latch, a stationary support, movable latch means, and means pivotally and yieldably mounting said latch means at two spaced points with respect to said support whereby the same may be rocked in one or the other direction from its normal latching position.

11. In a latch, a stationary support, a spring tensioned rocking latch member formed to be rocked in one or the other direction from its normal latching position relatively to the support about two spaced points.

12. In a latch, a stationary support, movable latch means pivotally mounted and formed for movement in one or the other direction from a medial latching position, abutment means adapted to limit the latching position of said latch means, and means yieldably retaining said latch means in said medial position.

13. In a latch, a stationary support, movable latch means pivotally mounted and formed for movement in one or the other direction from a medial latching position, and means yieldably retaining said latch means in said medial position.

14. In a latch, a stationary support, movable latch means pivotally mounted for movement in one or the other direction from a medial latching position, spaced abutment means adapted to limit the latching position of said latch means and constituting fulcrums about which said latch means is adapted to be independently rocked in one or the other direction, and means adapted to yieldably engage said latch means with said abutment means.

15. In a latch, a casing having laterally slotted walls, latch means therein including a nose projected through the slot of one wall and an operating handle projected through the slot of another wall, fulcrum means permitting rocking movement of said latch means in one or the other direction from a medial latching position, and means adapted to yieldably retain said latch means in said medial position.

In testimony whereof I affix my signature hereto, this 25th day of April, 1924.

ARTHUR CLAUD-MANTLE.